United States Patent
Mizuura

(10) Patent No.: US 8,560,870 B2
(45) Date of Patent: Oct. 15, 2013

(54) APPARATUS AND METHOD FOR DETERMINING DEVICES USED BY AN APPLICATION BASED ON A MANAGEMENT DATA, AND CONTROLLING POWER STATE OF THE DETERMINED DEVICES

(75) Inventor: Yasuyuki Mizuura, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 13/093,583

(22) Filed: Apr. 25, 2011

(65) Prior Publication Data

US 2012/0066527 A1    Mar. 15, 2012

(30) Foreign Application Priority Data

Sep. 9, 2010    (JP) ................................. 2010-202101

(51) Int. Cl.
G06F 1/26    (2006.01)
G06F 1/32    (2006.01)

(52) U.S. Cl.
USPC .......................................................... 713/320

(58) Field of Classification Search
USPC ................................. 713/300, 320
See application file for complete search history.

(56) References Cited

U.S. PATENT DOCUMENTS

| | | | | |
|---|---|---|---|---|
| 5,339,445 | A * | 8/1994 | Gasztonyi | 713/324 |
| 6,006,285 | A * | 12/1999 | Jacobs et al. | 710/14 |
| 7,111,182 | B2 * | 9/2006 | Gary | 713/324 |
| 7,925,635 | B1 * | 4/2011 | Ravulur et al. | 707/688 |
| 2001/0056509 | A1 * | 12/2001 | Iwata | 710/20 |
| 2003/0159075 | A1 * | 8/2003 | Miyazaki | 713/300 |
| 2004/0006690 | A1 * | 1/2004 | Du et al. | 713/2 |
| 2004/0057069 | A1 | 3/2004 | Ikeda | |
| 2005/0246561 | A1 | 11/2005 | Wu et al. | |
| 2006/0020891 | A1 | 1/2006 | Obara et al. | |
| 2007/0025195 | A1 | 2/2007 | Oh et al. | |

FOREIGN PATENT DOCUMENTS

| | | |
|---|---|---|
| JP | 07-302138 | 11/1995 |
| JP | 11-175205 | 7/1999 |
| JP | 2000-305673 | 11/2000 |
| JP | 2001-43098 | 2/2001 |
| JP | 2001-285543 | 10/2001 |
| JP | 2003-134225 | 5/2003 |
| JP | 2004-098399 | 4/2004 |
| JP | 2005-228335 | 8/2005 |
| JP | 2006-031625 | 2/2006 |

(Continued)

OTHER PUBLICATIONS

Japanese Patent Application No. 2010-202101; Notice of Reasons for Rejection; Mailed Jul. 19, 2011 (English translation).

Primary Examiner — Thomas Lee
Assistant Examiner — Xuxing Chen
(74) Attorney, Agent, or Firm — Blakely, Sokoloff, Taylor & Zafman LLP

(57) ABSTRACT

According to one embodiment, an information processing apparatus includes a plurality of power control target devices, a storage unit configured to store management data, and a device management module. The device management module is configured to determine whether a new process is started, based on process information indicative of a list of processes which are being executed, the process information being managed by an operating system, to determine, based on the management data, when the new process is started, one or more power control target devices which are used by an application program corresponding to the new process, and to power on, among the determined one or more power control target devices, a power control target device which is in a power-off state.

4 Claims, 5 Drawing Sheets

(56) References Cited

FOREIGN PATENT DOCUMENTS

| | | |
|---|---|---|
| JP | 2006-146650 | 6/2006 |
| JP | 2007-35044 | 2/2007 |
| JP | 2008-077563 | 4/2008 |
| JP | 2010-140156 | 6/2010 |
| JP | 2011-159184 | 8/2011 |

* cited by examiner

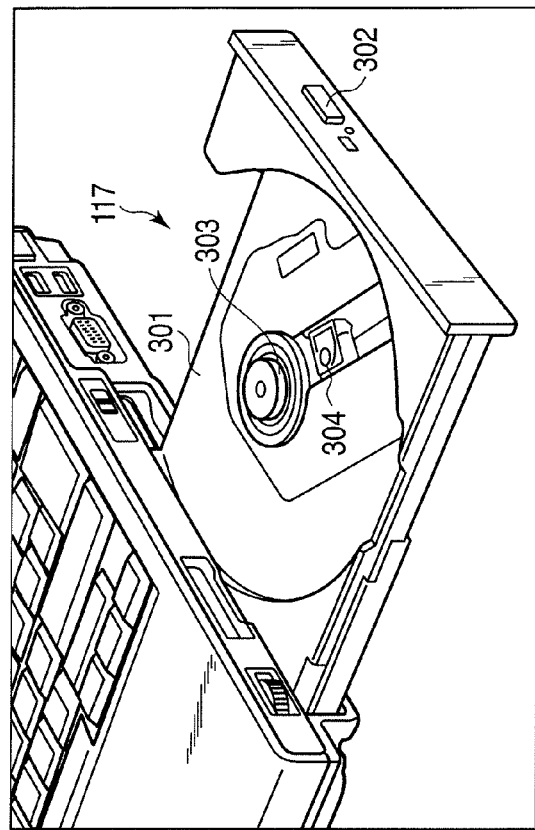
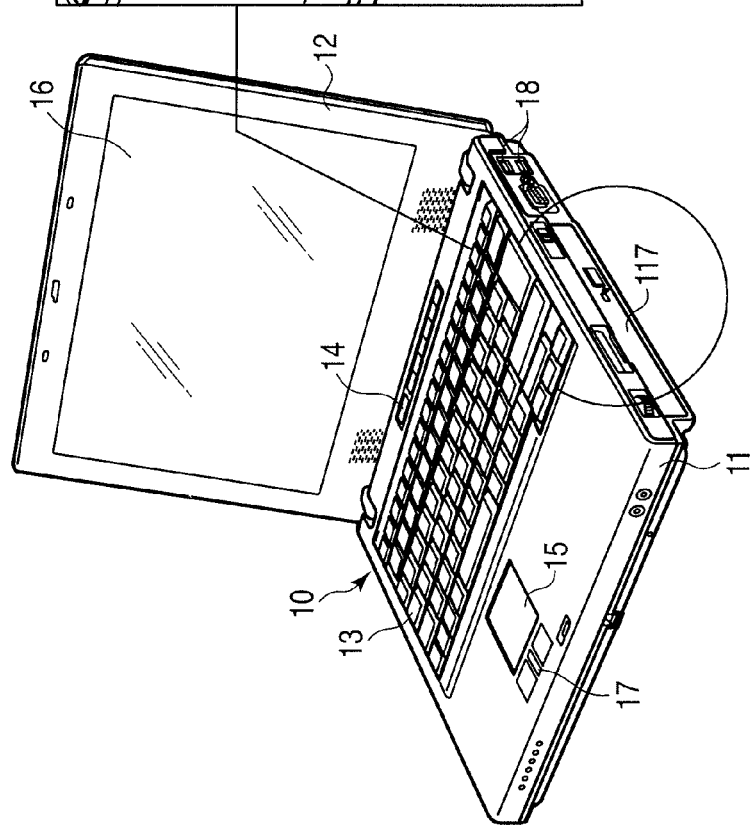
FIG. 1

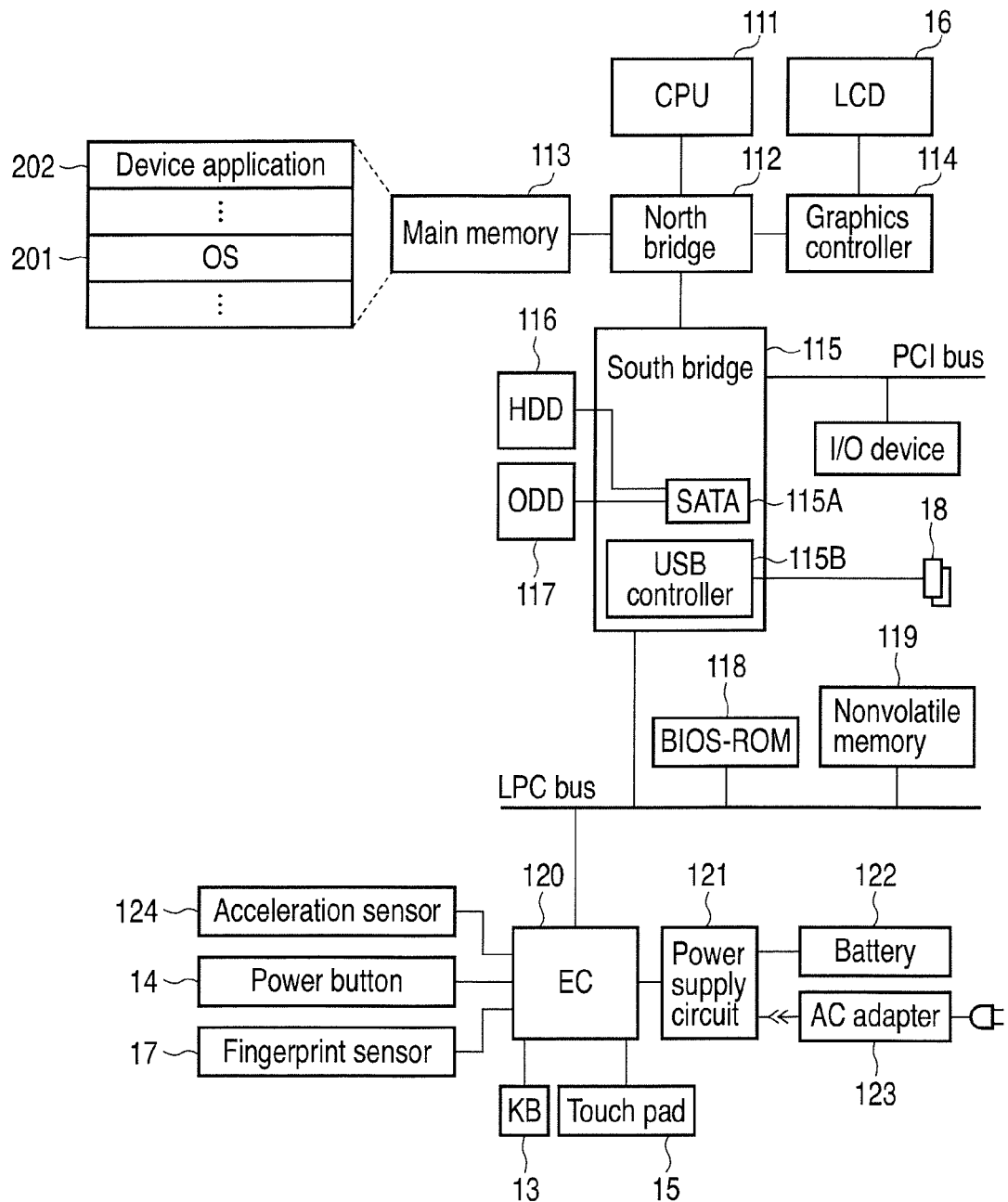
F I G. 2

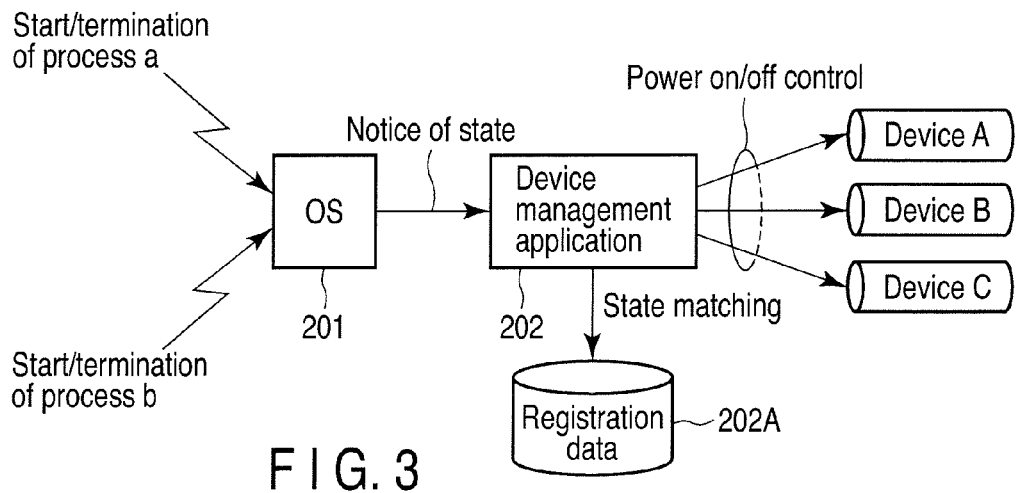

FIG. 3

| Process name | Device name |
|---|---|
| Disc writing application | Built-in ODD |
| PC recovery media creation application | Built-in ODD |
| PC recovery media creation application | USB device |
| Fingerprint authentication application | Fingerprint authentication sensor |

FIG. 4

| Device name | Present power state |
|---|---|
|  |  |
|  |  |
|  |  |
| ⋮ | ⋮ |

| Name of process which is being executed | Present power state |
|---|---|
| AAA.EXE |  |
| BBB.EXE |  |
| CCC.EXE |  |
| ⋮ | ⋮ |

FIG. 8

APPARATUS AND METHOD FOR DETERMINING DEVICES USED BY AN APPLICATION BASED ON A MANAGEMENT DATA, AND CONTROLLING POWER STATE OF THE DETERMINED DEVICES

CROSS-REFERENCE TO RELATED APPLICATIONS

This application is based upon and claims the benefit of priority from Japanese Patent Application No. 2010-202101, filed Sep. 9, 2010; the entire contents of which are incorporated herein by reference.

FIELD

Embodiments described herein relate generally to an information processing apparatus and a device control method.

BACKGROUND

In recent years, various kinds of notebook-type or laptop-type portable personal computers have been developed. In the field of portable personal computers, there has been a demand for achieving power saving of such computers.

To meet this demand, recently, a computer having a function of powering off a device within the computer, where necessary, has been developed. By powering off the device, the power consumption of the computer can be reduced.

However, at a time of starting the use of the device, for example, a user himself/herself has to perform an operation of powering on the device. If an application program which uses a certain device is started in the state in which the device is powered off, it is possible that this application program cannot normally operate.

In addition, there is known a technique wherein a device driver which controls a specific device detects the start and termination of a purpose-specific application program which uses this specific device, and thereby the state of the specific device is switched between an operation mode and a power-save mode.

In general, however, in a computer, the relationship between a device and an application program which uses the device is not always a one-to-one correspondence. Depending on an application program which is started, the device which is used by this application program may differ. Besides, a certain device may be used by some application programs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a an exemplary perspective view illustrating the external appearance of an information processing apparatus according to an embodiment;

FIG. 2 is an exemplary block diagram illustrating a system configuration of the information processing apparatus of the embodiment;

FIG. 3 is an exemplary block diagram for describing the function of a device management application program which is used in the information processing apparatus of the embodiment;

FIG. 4 is an exemplary view illustrating an example of registration data (management data) which is used in the information processing apparatus of the embodiment;

FIG. 5 is an exemplary view for describing an example of the present power states of devices, which are managed by the information processing apparatus of the embodiment;

FIG. 8 an exemplary view illustrating an example of a process list which is managed by an operating system of the information processing apparatus of the embodiment.

DETAILED DESCRIPTION

Figure 6:
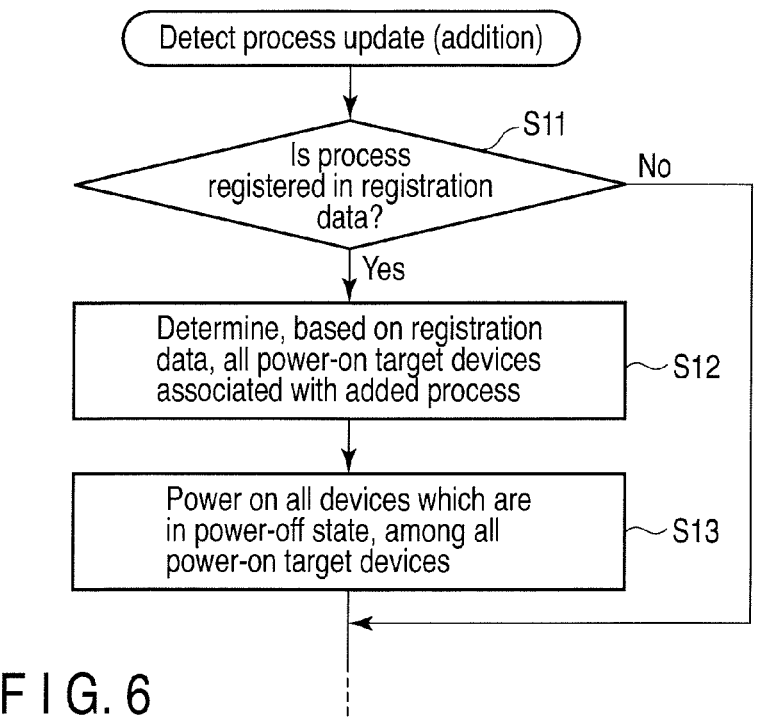
FIG. 6 is an exemplary flow chart illustrating an example of the procedure of a device power-on process which is executed by the information processing apparatus of the embodiment.

Various embodiments will be described hereinafter with reference to the accompanying drawings.

In general, according to one embodiment, an information processing apparatus comprises a main body; a plurality of power control target devices provided in the main body; a storage unit configured to store management data indicative of one or more power control target devices, among the plurality of power control target devices, which are used by each of a plurality of application programs; and a device management module provided in the main body. The device management module is configured to determine whether a new process is started, based on process information indicative of a list of processes which are being executed, the process information being managed by an operating system, to determine, based on the management data, when the new process is started, one or more power control target devices which are used by an application program corresponding to the new process, and to power on, among the determined one or more power control target devices, a power control target device which is in a power-off state.

To begin with, referring to FIG. 1, the structure of an information processing apparatus according to an embodiment is described. The information processing apparatus is realized, for example, as a battery-powerable portable notebook personal computer 10.

FIG. 1 is a perspective view showing the computer 10, as viewed from the front side, in the state in which a display unit thereof is opened. The computer 10 comprises a computer main body (also referred to simply as "main body") 11 and a display unit 12. A display device that is composed of an LCD (Liquid Crystal Display) 16 is built in the display unit 12.

The display unit 12 is supported and attached to the computer main body 11 such that the display unit 12 is freely rotatable between an open position where a top surface of the computer main body 11 is exposed and a closed position where the top surface of the computer main body 11 is covered by the display unit 12. The computer main body 11 has a thin box-shaped housing. A keyboard 13, a power button 14 for powering on/off the computer 10, a touch pad 15 and a fingerprint sensor (also referred to as "fingerprint authentication sensor") 17 are disposed on the top surface of the computer main body 11.

In addition, an optical disc drive 117 for driving media (optical disc media) is provided in the computer main body 11. The optical disc drive 117 is configured to be able to access various kinds of optical disc media such as a DVD, a CD, etc. The optical disc drive 117 comprises, for example, a tray 301 on which an optical disc medium is removably mounted, an eject button 302, a spindle motor 303, and an optical pickup head 304.

The tray 301 is attached to the housing of the optical disc drive 117 such that the tray 301 may move between an inserted position where the tray 301 is loaded in the main body 11 and a projected position where the tray 301 is projected to the outside from the main body 11. The eject button 302 is provided on the housing of the optical disk drive 117, for example, on the outer wall of the tray 301. The eject button 302 is a switch for generating an eject signal.

The spindle motor 303 is a motor for rotating the medium (optical disc medium) that is loaded in the optical disc drive 117. The optical pickup head 304 radiates a light beam (laser beam) on the medium, and outputs a detection signal corresponding to reflective light from the medium. The optical pickup head 304 is moved in the radial direction of the medium by a thread mechanism (optical pickup head moving mechanism) which is provided in the tray 301.

In addition, the computer main body 11 is provided with a USB terminal 18 to which a USB device is detachably connected.

FIG. 2 shows the system configuration of the computer 10.

The computer 10 comprises a CPU 111, a north bridge 112, a main memory 113, a graphics controller 114, a south bridge 115, a hard disk drive (HDD) 116, an optical disc drive (ODD) 117, a BIOS-ROM 118, a nonvolatile memory 119, an embedded controller (EC) 120, a power supply circuit 121, and an acceleration sensor 124.

The CPU 111 is a processor which controls the operations of the components of the computer 10. The CPU 111 executes an operating system (OS) 201 and various application programs, which are loaded from the HDD 116 into the main memory 113. The application programs include a device management application program 202.

The device management application program 202 can individually power on and off, where necessary, a plurality of power control target devices (e.g. optical disc drive (ODD) 117, fingerprint sensor 17, USB device, etc.) within the computer 10. In addition, the CPU 111 executes a BIOS (Basic Input/Output System) which is stored in the BIOS-ROM 118. The BIOS is a program for hardware control.

The north bridge 112 is a bridge device which connects a local bus of the CPU 111 and the south bridge 115. The north bridge 112 has a function of executing communication with the graphics controller 114. Further, the north bridge 112 includes a memory controller which controls the main memory 113.

The graphics controller 114 is a display controller which controls the LCD 16 that is used as a display monitor of the computer 10. The south bridge 115 is connected to a PCI (Peripheral Component Interconnect) bus and an LPC (Low Pin Count) bus.

The HDD 116 and ODD 117 are connected to the south bridge 115 via a serial ATA (SATA) bus or the like. The south bridge 115 includes a SATA controller 115A. The SATA controller 115A is a controller for controlling the HDD 116 and ODD 117. Further, the south bridge 115 includes a USB controller 115B. The USB controller 115B controls a USB device which is connected to the USB terminal 18.

The embedded controller (EC) 120 is a controller for power management. The embedded controller (EC) 120 may include a keyboard controller which controls the keyboard (KB) 13 and touch pad 15. The EC 120 cooperates with the power supply circuit 121 to power on/off the computer 10 in response to the user's operation of the power button switch 14. The power supply circuit 121 uses power from a battery 122 which is built in the computer main body 11 or external power which is supplied via an AC adapter 123, thereby generating system power that is to be supplied to the respective components of the computer 10. Furthermore, under the control of the device management application program 202 or BIOS, the EC 120 can power on/off some predetermined power control target devices (e.g. optical disc drive (ODD) 117, fingerprint sensor 124, etc.) within the computer 10.

Next, referring to FIG. 3, the functions of the device management application program 202 are concretely described. As has been described above, the device management application program 202 is a program for individually powering on/off some power control target devices (in FIG. 3, device A, device B and device C) within the computer 10 while the computer 10 is in operation.

In the case where the user wishes to start the use of a certain device, the user is to first start an application program which uses this device. Thus, in the present embodiment, control is executed to switch power-on/off of a device which is used by an application program in accordance with the start and termination of this application program.

The device management application program 202 has the following functions:

(1) A function of switching power-on/off of each of the devices A, B and C, (2) A function of monitoring a process state which is held by the OS 201 (process information indicated by a list of processes which are being executed), and detecting a change of the process state (the addition of a new process or the termination of a process), and (3) A function of executing a data search, data registration, and a change of registered data, with respect to registration data 202A.

In the registration data 202A, management data, which is indicative of the correspondency between a plurality of application programs and a plurality of power control target devices which are used by the application programs, is registered. In other words, the management data indicates one or more power control target devices, among the plurality of power control target devices, which are used by each of the plurality of application programs. Using the registration data 202A, the device management application program 202 manages the application programs and the devices (power control target devices) which are used by these applications. A certain application program may use two or more of the plural power control target devices. In this case, in the registration data 202A, this application program is associated with the two or more devices. Another application program may use one device of the plural power control target devices. In this case, in the registration data 202A, this another application program is associated with this one device. The registration data 202A is stored in a storage unit, for example, the HDD 116 or nonvolatile memory 119.

FIG. 4 shows an example of the content of the registration data 202A. In FIG. 4, the case is assumed in which the power control target devices are the optical disc drive 117 (built-in ODD), USB device and fingerprint authentication sensor 17. Application programs, which use the optical disc drive 117 (built-in ODD), are a disc writing application program (ODD writing application program) and a PC recovery media creation application program. Thus, the disc writing application program (ODD writing application program) is associated with the built-in ODD as a device which is used by the disc write application program.

The PC recovery media creation application program is a program which creates recovery media by writing a data image, which is prestored in, e.g. a recovery area in the HDD 116, in optical disc media or a USB memory. As mentioned above, the PC recovery media creation application program, too, uses the built-in ODD. Thus, the PC recovery media creation application program is associated with the built-in ODD as a device which is used by the PC recovery media creation application program. The PC recovery media creation application program uses not only the disc drive 117 (built-in ODD), but also the USB device. Thus, the PC recovery media creation application program is also associated with the USB device, as well as the built-in ODD, as a device which is used by the PC recovery media creation application program.

The fingerprint authentication application program is associated with the fingerprint authentication sensor 17 as a device which is used by the fingerprint authentication application program.

In this manner, when there are a plurality of application programs which use a certain power control target device, this power control target device is associated with the plural application programs. In addition, when a certain application program uses two or more power control target devices, these two or more power control target devices are associated with this application program.

In the registration data 202A, application program'names corresponding to predetermined application programs may be registered, or process names corresponding to predetermined application programs may be registered.

In addition, the device management application program 202 can manage the present power states (power-on state, power-on state) of the power control target devices A, B and C by using a table shown in FIG. 5.

A description will now be given of an operation of automatically switching the power state of one or more of a plurality of power control target devices from a power-off state to a power-on state.

The device management application program 202 determines whether a new process has been generated and started, based on process information which is managed by the OS 201 and is indicative of a list of processes which are being executed. When a new process has been started, that is a new process has been added to the list of processes which are being executed, the device management application program 202 determines, based on the registration data 202A, one or more power control target devices which are used by an application program corresponding to the new process, and powers on, in cooperation with the EC 120, all power control target device(s) in the power-off state among the determined one or more power control target devices.

Assuming the case in which the user has started an ODD writing application program, the operation of the device management application program 202 is described. By the start of the ODD writing application program, a new process corresponding to the ODD writing application program is generated and started. The device management application program 202 receives process information from the OS 201, for example, at regular intervals, and compares the newly received process information with the previously received process information. Thereby, the device management application program 202 can detect that the new process (ODD writing process) has been generated, that is, the new process (ODD writing process) has been added to the list of processes which are being executed and are indicated by the process information. Based on the registration data 202A, the device management application program 202 determines the device (power-on target device) which is used by the added ODD writing process. In this case, it is determined that the ODD writing process is a process which uses the built-in ODD, that is, the device which is used by the ODD writing process is the built-in ODD. The device management application program 202 determines whether the built-in ODD is in a power-off state or not. If the built-in ODD is in the power-off state, the device management application program 202 powers on the built-in ODD. By powering on the built-in ODD, the built-in ODD is recognized by the OS 201. The ODD writing process can normally access the built-in ODD through the OS 201.

Thus, even when the built-in ODD is set in the power-off state for the purpose of power-saving, if the ODD writing process is started during the period in which the built-in ODD is in the power-off state, the built-in ODD is automatically powered on. Therefore, simply by starting the ODD writing application, the user can use the built-in ODD without performing a special operation for powering on the built-in ODD.

Next, assuming the case in which the user has started a PC recovery media creation application program, the operation of the device management application program 202 is described. By the start of the PC recovery media creation application program, a new process corresponding to the PC recovery media creation application program is generated and started. The device management application program 202 receives process information from the OS 201, for example, at regular intervals, and compares the newly received process information with the previously received process information. Thereby, the device management application program 202 can detect that the new process (PC recovery media creation process) has been generated and started, that is, the new process (PC recovery media creation process) has been added to the list of processes which are being executed and are indicated by the process information. Based on the registration data 202A, the device management application program 202 determines the device (power-on target device) which is used by the added PC recovery media creation process. In this case, it is determined that the PC recovery media creation process is s process which uses the built-in ODD and the USB device, that is, the devices which are used by the PC recovery media creation process are the built-in ODD and USB device. The device management application program 202 determines whether the built-in ODD is in a power-off state or not, and whether the USB device is in a power-off state or not. If the built-in ODD is in the power-off state, the device management application program 202 powers on the built-in ODD. If the USB device is in the power-off state, the device management application program 202 powers on the USB device.

Next, a description is given of an operation of automatically switching the power state of one or more power control target devices among a plurality of power control target devices from the power-on state to the power-off state.

The device management application program 202 determines whether a certain process, which is being executed, has been terminated or not, based on the process information which is managed by the OS 201. When a certain process, which is being executed, has been terminated, the device management application program 202 determines, based on the registration data 202A, one or more power control target devices which are used by the application program corresponding to the terminated process, and powers off, in cooperation with the EC 120, a power control target device (a first power control target device), among the determined one or more power control target devices, which is in the power-on state and in association with which none of processes of all other associated applications is being executed. That is, the first power control target device is a device which is in the power-on state, none of processes of all other application programs which are associated with the first power control target device is being executed.

Next, assuming the case in which the user has terminated the ODD writing application program, the operation of the device management application program 202 is described.

By the termination of the ODD writing application program, the ODD writing process is terminated. The device management application program 202 receives process information from the OS 201, for example, at regular intervals, and compares the newly received process information with the previously received process information. Thereby, the device management application program 202 can detect that the process (ODD writing process), which is being executed, has been terminated. Based on the registration data 202A, the device management application program 202 determines the power control target device which is used by the terminated ODD writing process. In this case, it is determined that the ODD writing process is a process which uses the built-in ODD, that is, the device which is used by the ODD writing process is the built-in ODD. The device management application program 202 determines whether the built-in ODD is in a power-on state or not. If the built-in ODD is in the power-on state, the device management application program 202 further determines whether each of the processes of all other application programs using the built-in ODD is being executed or not. In this case, the other application program using the built-in ODD is only the PC recovery media creation application program. Thus, the device management application program 202 determines whether the process of the PC recovery media creation application program is being executed or not. If the process of the PC recovery media creation application program is not being executed, the device management application program 202 powers off the built-in ODD. On the other hand, if the process of the PC recovery media creation application program is being executed, it is possible that the PC recovery media creation application program may use the built-in ODD, and thus the device management application program 202 does not power off the built-in ODD and keeps the built-in ODD in the power-on state.

In this manner, the device management application program 202 determines the device that is to be powered on, by referring to the registration data 202A each time a process is added, and powers on this device, and the device management application program 202 determines the device that is to be powered off by referring to the registration data 202A each time the process is terminated, and powers off this device.

Accordingly, without being aware of the power state of a device, the user can use the device by starting an application which uses the device. In addition, since the device is powered off in response to the termination of the application, the power-saving effect or ecological effect can be expected.

Furthermore, the device management application program 202 can automatically power off a power control target device, responding to the continuation for a predetermined time period of the non-use state of the power control target device, or the occurrence of an event of requesting the power-off of the power control target device by the user's operation. For example, the device management application program 202 can automatically power off the optical disc drive (ODD) 117, when the non-use state of the optical disc drive (ODD) 117 has continued for a predetermined time period or when an event of requesting power-off of the optical disc drive (ODD) 117 has been generated by the user's operation. If the ODD writing application program or PC recovery media creation application has been started by the user in the state in which the optical disc drive (ODD) 117 is powered off, the device management application program 202 powers on the optical disc drive (ODD) 117. When it is detected that one of the ODD writing application program and PC recovery media creation application has been terminated and the other is not being executed, the device management application program 202 powers off the optical disc drive (ODD) 117.

Thereby, without being aware of the power state of the built-in ODD, the user can start the use of the built-in ODD, simply by starting an arbitrary application which uses the built-in ODD. In addition, since the device is powered off in interlock with the termination of the application, the power-saving effect or ecological effect can be expected.

The function of automatically powering off a power control target device, responding to the continuation for a predetermined time period of the non-use state of the power control target device or the occurrence of an event of requesting the power-off of the power control target device by the user's operation, may be executed by a program (e.g. a power-saving utility program) which is different from the device management application program 202.

Next, referring to a flow chart of FIG. 6, a description is given of an example of the procedure of a device power-on process which is executed when a process update (addition) is detected.

The device management application program 202 receives process information, for example, from the OS 201 at regular intervals, and compares the newly received process information with the previously received process information, thereby determining whether a new process has been added, that is, a new process has been executed and started. FIG. 8 shows an example of the process information. As shown in FIG. 8, process information 500 is indicative of a list of processes which are being executed in the computer 10.

If the device management application program 202 determines that a new process has been added, the device management application program 202 refers to the registration data 202A, and determines whether the added process is a process of an application program which is registered in the registration data 202A (step S11).

If the added process is a process of an application program which is registered in the registration data 202A, the device management application program 202 determines, based on the registration data 202A, all devices (all power-on target devices) which are associated with the added process (step S12). In step S12, if two devices are associated with the added process, the two devices are determined to be power-on target devices. Then, the device management application program 202 powers on, among all power-on target devices, a device which is currently in the power-off state (step S13).

Figure 7:
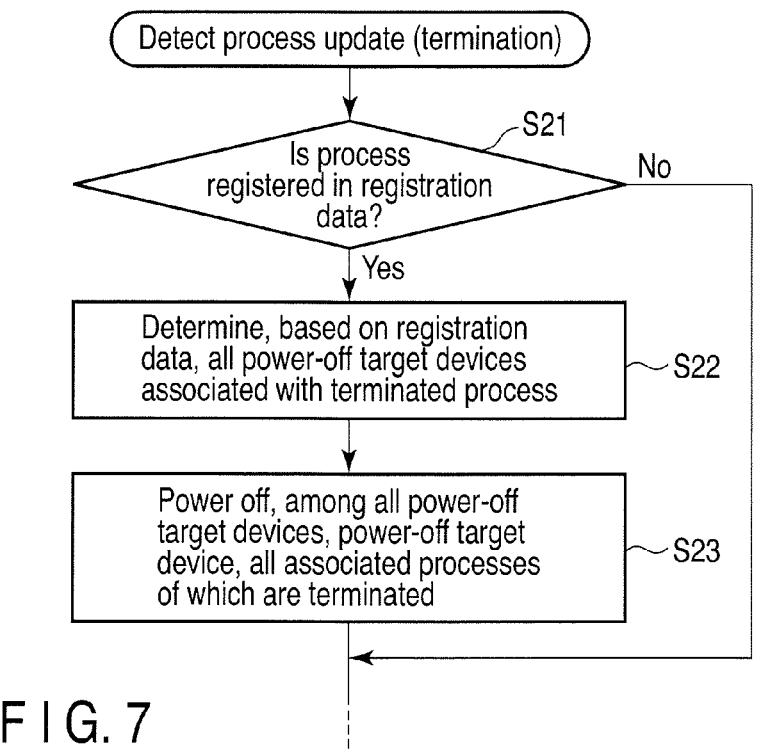
FIG. 7 is an exemplary flow chart illustrating an example of the procedure of a device power-off process which is executed by the information processing apparatus of the embodiment.

Next, referring to a flow chart of FIG. 7, a description is given of an example of the procedure of a device power-off process which is executed when a process update (termination) is detected.

The device management application program 202 receives process information, for example, from the OS 201 at regular intervals, and compares the newly received process information with the previously received process information, thereby determining whether a process has been deleted, that is, a process, which is being executed, has been terminated.

If the device management application program 202 determines that a certain process has been terminated, the device management application program 202 refers to the registration data 202A, and determines whether the terminated process is a process of an application program which is registered in the registration data 202A (step S21).

If the terminated process is a process of an application program which is registered in the registration data 202A, the device management application program 202 determines, based on the registration data 202A, all devices (all power-off target devices) which are associated with the terminated process (step S22). In step S22, if two devices are associated with the terminated process, the two devices are determined to be power-off target devices. Then, the device management application program 202 powers off, among all power-off target devices, a device which is currently in the power-on state and in association with which none of processes of all other associated application programs is being executed (step S23).

Figure 9:
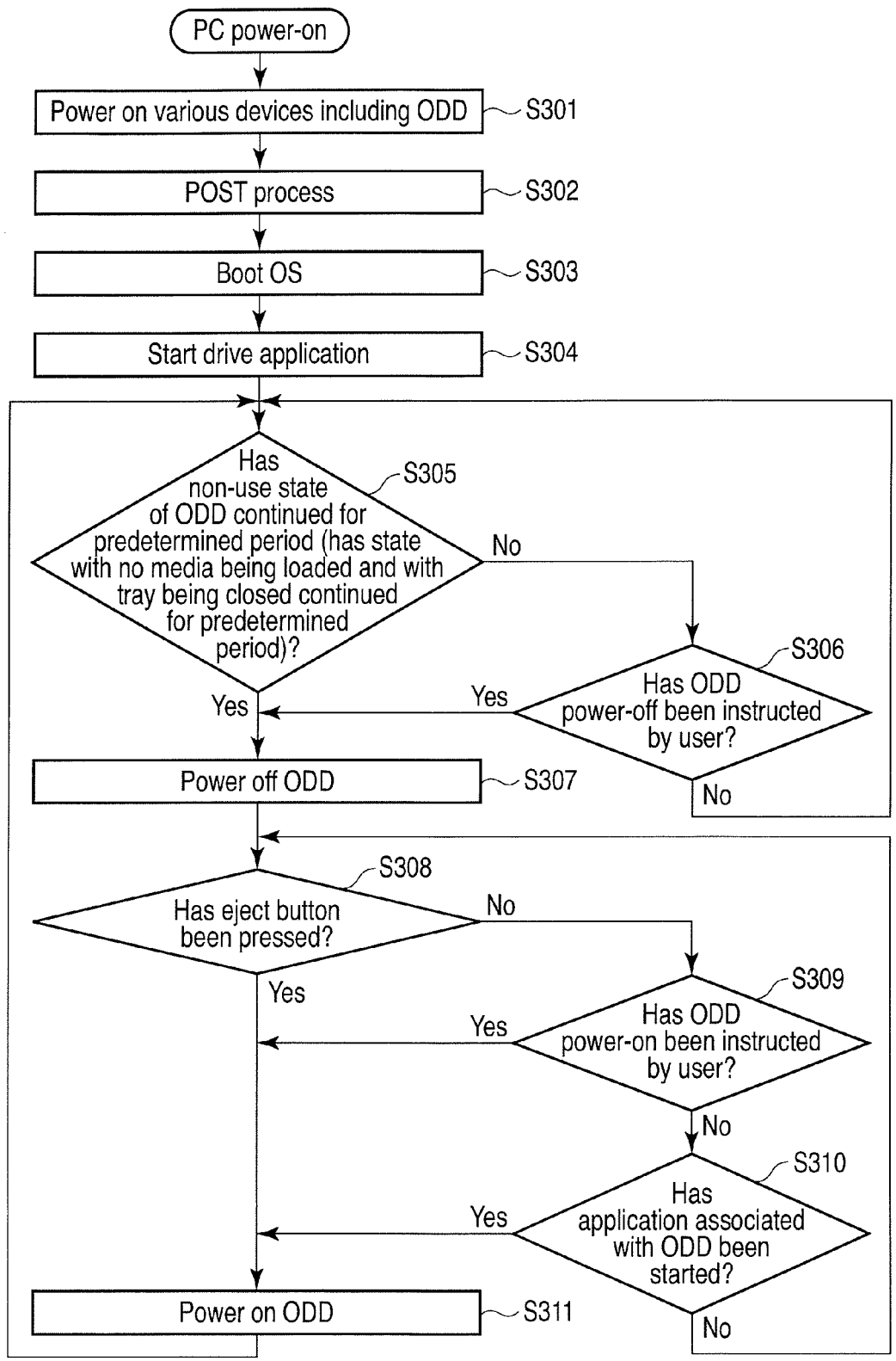
FIG. 9 is an exemplary flow chart for describing the entirety of a device power management process which is executed by the information processing apparatus of the embodiment.

Next, referring to a flow chart of FIG. 9, a description is given of an example of the entirety of a device power management process which is executed by the computer 10. In the description below, the optical disc drive (ODD) 117 is taken as an example of the power control target device.

When the computer 10 is powered on, the EC 120 powers on various devices in the computer 10 (step S301). In step S301, the optical disc drive (ODD) 117 is also powered on. The CPU 111 executes the BIOS. The BIOS executes a power-on self test process (POST) (step S302). Then, the BIOS boots the OS 201 (step S303). After the OS 201 is booted, the device management application program 202 is automatically started (step S304). The device management application program 202 executes the following process.

When the non-use state of the optical disc drive (ODD) 117 has continued for a predetermined time period (YES in step S305) or when an event of requesting power-off of the optical disc drive (ODD) 117 has been generated by the user's operation (YES in step S306), the device management application program 202 powers off the optical disc drive (ODD) 117 (step S307). The device management application program 202 recognizes, for example, the state in which no medium is loaded in the optical disc drive (ODD) 117 and the tray 301 is closed, as the non-use state of the optical disc drive (ODD) 117. If the state in which no medium is loaded and the tray 301 is closed has continued for a predetermined period (e.g. one minute), the device management application program 202, in cooperation with the BIOS and EC 120, automatically stops power supply to the optical disc drive (ODD) 117 to power off the optical disc drive (ODD) 117.

A hot key operation, for instance, can be used as the user's operation for generating an event of requesting power-off of the optical disc drive (ODD) 117. For example, the user can request power-off of the optical disc drive (ODD) 117 by simultaneously operating a plurality of predetermined keys of the keyboard 13. In addition, the user can instruct power-on of the optical disc drive (ODD) 117 by operating another hot key.

After the optical disc drive (ODD) 117 is powered off, the device management application program 202 restores the optical disc drive (ODD) 117 to the power-on state by using, as a trigger, the operation of the eject button 302, the occurrence of an event of requesting power-on of the optical disc drive (ODD) 117 by the user's operation, or the start of an application program which is associated with the optical disc drive (ODD) 117 (an application program using the optical disc drive (ODD) 117).

Specifically, the device management application program 202 first determines whether the eject button 302 has been pressed (step S308). If the eject button 302 has been pressed (YES in step S308), the device management application program 202, in cooperation with the EC 120, executes a process of supplying power to the optical disc drive (ODD) 117, and a process of instructing the optical disc drive (ODD) 117 to open the tray 302 (step S311).

When the event of requesting power-on of the optical disc drive (ODD) 117 has been generated by, for example, a hot key operation by the user in the state in which the optical disc drive (ODD) 117 is powered off (YES in step S309), the device management application program 202, in cooperation with the EC 120, executes a process of supplying power to the optical disc drive (ODD) 117 (step S311).

When a predetermined application program which is associated with the optical disc drive (ODD) 117 has been executed in the state in which the optical disc drive (ODD) 117 is powered off (i.e. when a newly started process is a process of an application program using the ODD) (YES in step S310), the device management application program 202, in cooperation with the EC 120, executes a process of supplying power to the optical disc drive (ODD) 117 (step S311).

In the meantime, also when all application programs using the optical disc drive (ODD) 117 have been terminated, the device management application program 202 can execute the process of powering off the optical disc drive (ODD) 117.

In the example of FIG. 9, the process of determining whether the application program associated with the optical disc drive (ODD) 117 has been executed is executed after the optical disc drive (ODD) 117 is powered off. However, regardless of whether the optical disc drive (ODD) 117 is in the power-on state or in the power-off state, it is possible to determine, when a new process has been executed and started, whether the newly executed and started process is the process of the application which is associated with the ODD.

As has been described above, according to the present embodiment, whether a new process is started is determined, based on the process information which is managed by the OS 201. When a new process is started, one or more power control target devices, which are associated with an application program corresponding to the new process, are determined based on the registration data 202A. Among the determined one or more power control target devices, a power control target device which is in the power-off state is powered on. Therefore, the power states of the respective power control target devices can easily be switched from the power-off state to the power-on state.

For example, the LCD 16 may display a screen for prompting the user to designate one or more application programs which use each of a plurality of power control target devices. The registration data 202A may store management data which has been input by the user's operation on the screen and which indicates one or more application programs using each of the plurality of power control target devices.

Needless to say, default management data may be pre-stored in the registration data 202A. A screen for prompting the user to edit the management data may be displayed, and the content of the management data may be updated according to the user's operation on this screen.

The number of power control target devices may be one. In this case, too, the power control target device can efficiently be powered on/off by using the registration data which is indicative of a plurality of application programs associated with this power control target device.

In the case where the power control target device is, for example, the built-in ODD, it is possible to execute such control as to power off the built-in ODD when the non-use state of the built-in ODD has continued for a predetermined period or when an event of requesting power-off of the built-in ODD has been generated by the user's operation, and to power on the built-in ODD when an application program associated with the built-in ODD has been started.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a main body;
   a plurality of power control target devices provided in the main body;
   a storage unit configured to store management data indicative of one or more power control target devices, among the plurality of power control target devices, which are used by each of a plurality of application programs; and
   a device management module configured to (i) receive from an operating system process information indicative of a list of processes which are being executed, (ii) determine whether a new process is started, based on a result of comparison between the received process information and last-received process information, (iii) determine, based on the management data, if the new process is started, one or more power control target devices which are used by an application program corresponding to the new process, and (iv) power on, among the determined one or more power control target devices, a power control target device which is in a power-off state,
   wherein the device management module is further configured to (i) determine whether a process being executed is terminated, based on the result of comparison between the received process information and the last-received process information, (ii) determine, based on the management data, if the process is terminated, one or more power control target devices which are used by an application program corresponding to the terminated process, and (iii) power off, among the determined one or more power control target devices, a power control target device which is in a power-on state and in association with which none of processes of all other associated application programs is being executed.

2. The information processing apparatus of claim 1, wherein the plurality of power control target devices include an optical disc drive, and the device management module is configured to power off the optical disc drive when a non-use state of the optical disc drive is continued for a predetermined period.

3. The information processing apparatus of claim 1, wherein the plurality of power control target devices include an optical disc drive, and the device management module is configured to power off the optical disc drive when an event of requesting power-off of the optical disc drive is generated by a user operation.

4. A device control method of controlling a plurality of power control target devices in an information processing apparatus, comprising:
   receiving from an operating system process information indicative of a list of processes which are being executed to determine whether a new process is started, based on a result of comparison between the received process information and last-received process information;
   determining, if the new process is started, one or more power control target devices which are used by an application program corresponding to the new process, based on management data indicative of one or more power control target devices, among the plurality of power control target devices, which are used by each of a plurality of application programs;
   powering on, among the determined one or more power control target devices, a power control target device which is in a power-off state;
   determining whether a process being executed is terminated, based on the result of comparison between the received process information and the last-received process information;
   determining, based on the management data, if the process is terminated, one or more power control target devices which are used by an application program corresponding to the terminated process;
   powering off, among the determined one or more power control target devices, a power control target device which is in a power-on state and in association with which none of processes of all other associated application programs is being executed.

* * * * *